US006597728B1

(12) United States Patent
Kondo

(10) Patent No.: US 6,597,728 B1
(45) Date of Patent: Jul. 22, 2003

(54) DEVICE AND METHOD FOR CORRECTING LOCAL OSCILLATION FREQUENCY OF RADIO RECEPTION DEVICE ACCORDING TO PILOT SYNCHRONOUS DETECTION

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/536,147

(22) Filed: Mar. 28, 2000

(30) Foreign Application Priority Data

Mar. 31, 1999 (JP) .......................................... 11/090898

(51) Int. Cl.$^7$ .............................. H04L 7/00; H04J 11/00
(52) U.S. Cl. ........................................ 375/149; 375/344
(58) Field of Search .............................. 375/145, 149, 375/224, 226, 344, 362, 364

(56) References Cited

U.S. PATENT DOCUMENTS

| 4,525,685 A | 6/1985 | Hesselberth et al. |
| 6,219,333 B1 * | 4/2001 | Ahn ........................... 370/203 |
| 6,320,917 B1 * | 11/2001 | Stott et al. ................... 375/344 |

FOREIGN PATENT DOCUMENTS

| GB | 2 313 527 | 11/1997 |
| WO | WO 96/32784 | 10/1996 |
| WO | WO 96/41427 | 12/1996 |

OTHER PUBLICATIONS

Takuya Sakaishi et al., "A Study of AFC Scheme for W–CDMA Mobile Station", *Proceedings of the 1999 IEICE General Conference*, B–5–115, Mar. 7, 1999, p. 466.

T. Watanabe et al., "A Performance of AFC for W–CDMA Mobile Station", Proceedings of the 1998 Communication Society Conference of IEICE (the Institute of Electronics, Information and Communication Engineers (Japan), 1998, pp. B–5–146.

* cited by examiner

Primary Examiner—Amanda T. Le
(74) Attorney, Agent, or Firm—Sughrue Mion, PLLC

(57) ABSTRACT

A pilot symbol detection section detects and extracts pilot symbols from a despread signal. An inter-symbol phase shift detection section detects the phase shifts between adjacent pilot symbols in a pilot symbol block (inter-symbol phase shifts). An inter-pilot block phase shift detection section detects the phase shifts between adjacent pilot symbol blocks (inter-pilot block phase shift). An inter-symbol phase shift averaging section takes the average of the inter-symbol phase shifts. An inter-pilot block phase shift averaging section takes the average of the inter-pilot block phase shifts. A frequency correction determination section determines an appropriate frequency correction based on the outputs of the inter-symbol phase shift averaging section and the inter-pilot block phase shift averaging section. A frequency correction signal outputted by the frequency correction determination section is used for correcting the frequency of a local oscillation signal which is used for the detection (despreading) of a received radio signal. A large frequency difference can be corrected accurately and at once regardless of whether it is at the beginning of communication or in the middle of communication.

24 Claims, 5 Drawing Sheets

DEVICE AND METHOD FOR CORRECTING LOCAL OSCILLATION FREQUENCY OF RADIO RECEPTION DEVICE ACCORDING TO PILOT SYNCHRONOUS DETECTION

BACKGROUND OF THE INVENTION

The present invention relates to a device and a method for correcting the local oscillation frequency of a local oscillator of a radio reception device according to pilot synchronous detection.

DESCRIPTION OF THE PRIOR ART

In mobile radio communication systems, higher usage efficiency of the radio wave frequency is desired for increasing the subscriber capacity of the mobile radio communication systems. For attaining the objects, mobile radio communication systems applying pilot synchronous detection to CDMA (Code Division Multiple Access) have been proposed. In the pilot synchronous detection, frequency difference (shift) between a received radio signal and a radio reception device (a local oscillator of the radio reception device) has to be corrected and eliminated. Especially, techniques capable of correcting the frequency shift in a wide frequency range (bandwidth) and with high accuracy are now being required in order to implement mobile radio communication devices capable of receiving radio signals from base stations correctly.

For the frequency correction in the pilot synchronous detection, pilot symbol blocks (each of which is composed of a predetermined number of pilot symbols) are inserted periodically in a transmitted radio signal. Generally, the frequency correction is executed by detecting phase shifts between adjacent pilot symbol blocks and taking the average of the phase shifts. The "phase shift between adjacent pilot symbol blocks" means a phase shift (relative to a local oscillation signal outputted by the local oscillator of the radio reception device) which occurs between the adjacent pilot symbol blocks. When there is no frequency difference between the transmitted (received) radio signal and the local oscillator of the radio reception device, each symbol of the received radio signal is received on each cycle of the local oscillation signal correctly, and thus the phase shift becomes 0. On the other hand, when a frequency difference exists between the transmitted (received) radio signal and the local oscillator, a certain amount of phase shift occurs. The averaged phase shift is used by a feedback circuit for correcting the frequency of the local oscillation signal (which is used for the detection of the received radio signal) which is outputted by the local oscillator of the radio reception device. In the frequency correction method using the phase shift between the pilot symbol blocks, the frequency correction can be executed correctly if the phase shift between adjacent pilot symbol blocks is within ±180°. In the case of the frequency correction method using the phase shift between the pilot symbol blocks, high accuracy frequency correction can be executed even though correctable frequency range is narrow.

Meanwhile, if another frequency correction method using the phase shift between adjacent pilot symbols in a pilot symbol block is employed, the frequency correction can be executed correctly if the phase shift between adjacent pilot symbols is within ±180°. In the case of the frequency correction method using the phase shift between the pilot symbols, frequency correction with a wide correctable frequency range can be implemented even though the accuracy of the frequency correction is lower.

Further, there has been proposed a frequency correction method for realizing high speed extraction and high trackability by combining the above two frequency correction methods together (T. Watanabe et al. "A performance of AFC for W-CDMA mobile station", Proceedings of the 1998 Communications Society Conference of IEICE (the Institute of Electronics, Information and Communication Engineers (Japan)), B-5-146 (1998)). FIG. 1 is a schematic block diagram showing a frequency correction device employing the conventional frequency correction method of the document.

In the conventional frequency correction method, pilot symbols are extracted from a despread signal (received signal after despreading (descrambling)) and thereafter two-mode frequency correction is executed. First, the frequency correction is executed in mode #1, in which the phase shifts between adjacent pilot symbols in a pilot symbol block (inter-symbol phase shifts) are detected, the average of the inter-symbol phase shifts is figured out, and frequency correction is executed by use of the averaged inter-symbol phase shift. After a predetermined time has passed, the frequency correction mode is switched into mode #2, in which the phase shifts between adjacent pilot symbol blocks (inter-pilot block phase shifts) are detected, the average of the inter-pilot block phase shifts is figured out, and frequency correction is executed by use of the averaged inter-pilot block phase shift.

However, in the above conventional frequency correction method successively employing the two frequency correction methods, the pilot synchronous detection becomes impossible if the phase shift between adjacent pilot symbol blocks becomes ±180° or more after the switching into the mode #2. In the above conventional frequency correction method, the accuracy of the frequency correction could be improved by first executing coarse frequency correction based on the detection of the inter-symbol phase shifts (mode #1) and thereafter executing fine frequency correction based on the detection of the inter-pilot block phase shifts (mode #2). However, the timing for switching the frequency correction mode from mode #1 to mode #2 has to be provided properly and correctly in the conventional frequency correction method, and the frequency correction becomes incorrect if the switching into the inter-pilot block phase shift detection (mode #2) is executed before the frequency correction (inter-pilot block phase shift) converges and decreases within ±180°. Further, if signal propagation status changed during the data communication based on the inter-pilot block phase shift and the frequency difference (inter-pilot block phase shift) increased ±180° or more, frequency correction thereafter can not be executed correctly.

SUMMARY OF THE INVENTION

It is therefore the primary object of the present invention to provide a frequency correction device and a frequency correction method for correcting the local oscillation frequency of a local oscillator of a radio reception device according to pilot synchronous detection, by which the frequency correction can be executed with high accuracy even if a large frequency difference (phase shift) occurred.

Another object of the present invention is to provide a frequency correction device and a frequency correction method for correcting the local oscillation frequency of a local oscillator of a radio reception device according to pilot synchronous detection, by which a large frequency difference can be corrected accurately regardless of whether it is at the beginning of communication or in the middle of communication, without the need of providing proper and correct timing for mode switching etc.

In accordance with a first aspect of the present invention, there is provided a frequency correction device for correcting the frequency of a local oscillator of a radio reception device according to pilot synchronous detection, comprising a pilot symbol detection means, an inter-symbol phase shift detection means, an inter-pilot block phase shift detection means, a frequency correction determination means and a frequency correction means. The pilot symbol detection means detects and extracts pilot symbols from a received radio signal after despreading. The inter-symbol phase shift detection means detects an inter-symbol phase shift between adjacent pilot symbols in a pilot symbol block. The inter-pilot block phase shift detection means detects an inter-pilot block phase shift between adjacent pilot symbol blocks. The frequency correction determination means determines a frequency correction based on the inter-symbol phase shift which has been detected by the inter-symbol phase shift detection means and the inter-pilot block phase shift which has been detected by the inter-pilot block phase shift detection means. The frequency correction means executes frequency correction to the local oscillator based on the frequency correction which has been determined by the frequency correction determination means.

In accordance with a second aspect of the present invention, in the first aspect, the frequency correction determination means obtains a frequency correction based on inter-symbol phase shift as:

$$\text{frequency correction (symbol)} = (\text{inter-symbol phase shift})/2\pi \times SR \text{ (Hz)}$$

where "SR" is the symbol rate, and obtains frequency correction candidates based on inter-pilot block phase shift as:

$$\text{frequency correction (block, candidate)} = \{(\text{inter-pilot block phase shift}) \pm 2m\pi\}/2\pi \times PBR \text{ (Hz)},$$

where "PBR" is the pilot symbol block rate and "m" is a non-negative integer, and selects one of the frequency correction candidates (frequency correction (block, candidate)) that is the nearest to the frequency correction based on inter-symbol phase shift (frequency correction (symbol)) as the frequency correction.

In accordance with a third aspect of the present invention, in the first aspect, the frequency correction device further comprises an inter-symbol phase shift averaging means and an inter-pilot block phase shift averaging means. The inter-symbol phase shift averaging means takes the average of the inter-symbol phase shifts which have been detected by the inter-symbol phase shift detection means. The inter-pilot block phase shift averaging means takes the average of the inter-pilot block phase shifts which have been detected by the inter-pilot block phase shift detection means. The frequency correction determination means determines the frequency correction based on the averaged inter-symbol phase shift ($\Delta$(symbol ave)) which has been obtained by the inter-symbol phase shift averaging means and the averaged inter-pilot block phase shift ($\Delta$(block ave)) which has been obtained by the inter-pilot block phase shift averaging means.

In accordance with a fourth aspect of the present invention, in the third aspect, the frequency correction determination means obtains a frequency correction based on inter-symbol phase shift as:

$$\text{frequency correction (symbol)} = \Delta(\text{symbol ave})/2\pi \times SR \text{ (Hz)}$$

(where "SR" is the symbol rate), and obtains frequency correction candidates based on inter-pilot block phase shift as:

$$\text{frequency correction (block, candidate)} = \{\Delta(\text{block ave}) \pm 2 \ m\pi\}/2\pi \times PBR \text{ (Hz)}$$

(where "PBR" is the pilot symbol block rate and "m" is a non-negative integer), and selects one of the frequency correction candidates (frequency correction (block, candidate)) that is the nearest to the frequency correction based on inter-symbol phase shift (frequency correction (symbol)) as the frequency correction.

In accordance with a fifth aspect of the present invention, in the third aspect, the inter-symbol phase shift averaging means includes a first multiplier, a second multiplier, an adder and an accumulator. The first multiplier multiplies the inter-symbol phase shift detected by the inter-symbol phase shift detection means by $(1-\alpha)$ ($\alpha$: oblivion coefficient). The second multiplier multiplies the output of the accumulator by $\alpha$. The adder adds the $\alpha$-multiplied output of the accumulator and the $(1-\alpha)$-multiplied inter-symbol phase shift together and outputs the addition as the averaged inter-symbol phase shift ($\Delta$(symbol ave)). The accumulator accumulates the addition outputted by the adder.

In accordance with a sixth aspect of the present invention, in the third aspect, the inter-pilot block phase shift averaging means includes a first multiplier, a second multiplier, an adder and an accumulator. The first multiplier multiplies the inter-pilot block phase shift detected by the inter-pilot block phase shift detection means by $(1-\beta)$ ($\beta$: oblivion coefficient). The second multiplier multiplies the output of the accumulator by $\beta$. The adder adds the $\beta$-multiplied output of the accumulator and the $(1-\beta)$-multiplied inter-pilot block phase shift together and outputs the addition as the averaged inter-pilot block phase shift ($\Delta$(block ave)). The accumulator accumulates the addition outputted by the adder.

In accordance with a seventh aspect of the present invention, in the third aspect, the inter-symbol phase shift averaging means includes a first multiplier, a second multiplier, a first adder and a first accumulator, and the inter-pilot block phase shift averaging means includes a third multiplier, a fourth multiplier, a second adder and a second accumulator. In the inter-symbol phase shift averaging means, the first multiplier multiplies the inter-symbol phase shift detected by the inter-symbol phase shift detection means by $(1-\alpha)$ ($\alpha$: oblivion coefficient). The second multiplier multiplies the output of the first accumulator by $\alpha$. The first adder adds the a $\alpha$-multiplied output of the first accumulator and the $(1-\alpha)$-multiplied inter-symbol phase shift together and outputs the addition as the averaged inter-symbol phase shift ($\Delta$(symbol ave)). The first accumulator accumulates the addition outputted by the first adder. Meanwhile, in the inter-pilot block phase shift averaging means, the third multiplier multiplies the inter-pilot block phase shift detected by the inter-pilot block phase shift detection means by $(1-\beta)$ ($\beta$: oblivion coefficient). The fourth multiplier multiplies the output of the second accumulator by $\beta$. The second adder adds the $\beta$-multiplied output of the second accumulator and the $(1-\beta)$-multiplied inter-pilot block phase shift together and outputs the addition as the averaged inter-pilot block phase shift ($\Delta$(block ave)). The second accumulator accumulates the addition outputted by the second adder.

In accordance with an eighth aspect of the present invention, in the first aspect, the frequency correction means includes a D/A conversion means for executing D/A conversion to the output of the frequency correction determination means.

In accordance with a ninth aspect of the present invention, there is provided a frequency correction method for correcting the frequency of a local oscillator of a radio reception device according to pilot synchronous detection. The frequency correction method comprises a pilot symbol detection step, an inter-symbol phase shift detection step, an inter-pilot block phase shift detection step, a frequency correction determination step and a frequency correction step. In the pilot symbol detection step, pilot symbols are detected and extracted from a received radio signal after despreading. In the inter-symbol phase shift detection step, an inter-symbol phase shift between adjacent pilot symbols in a pilot symbol block is detected. In the inter-pilot block phase shift detection step, an inter-pilot block phase shift between adjacent pilot symbol blocks is detected. In the frequency correction determination step, a frequency correction is determined based on the inter-symbol phase shift which has been detected in the inter-symbol phase shift detection step and the inter-pilot block phase shift which has been detected in the inter-pilot block phase shift detection step. In the frequency correction step, frequency correction is executed to the local oscillator based on the frequency correction which has been determined in the frequency correction determination step.

In accordance with a tenth aspect of the present invention, in the frequency correction determination step of the ninth aspect, a frequency correction based on inter-symbol phase shift is obtained as:

frequency correction (symbol)=(inter-symbol phase shift)/$2\pi \times SR$ (Hz)

(where "SR" is the symbol rate), and frequency correction candidates based on inter-pilot block phase shift are obtained as:

frequency correction (block, candidate)={(inter-pilot block phase shift)$\pm 2m\pi$}/$2\pi \times PBR$ (Hz)

(where "PBR" is the pilot symbol block rate and "m" is a non-negative integer), and one of the frequency correction candidates (frequency correction (block, candidate)) that is the nearest to the frequency correction based on inter-symbol phase shift (frequency correction (symbol)) is selected as the frequency correction.

In accordance with an eleventh aspect of the present invention, in the ninth aspect, the frequency correction method further comprises an inter-symbol phase shift averaging step and an inter-pilot block phase shift averaging step. In the inter-symbol phase shift averaging step, the average of the inter-symbol phase shifts which have been detected in the inter-symbol phase shift detection step is taken. In the inter-pilot block phase shift averaging step, the average of the inter-pilot block phase shifts which have been detected in the inter-pilot block phase shift detection step is taken. In the frequency correction determination step, the frequency correction is determined based on the averaged inter-symbol phase shift ($\Delta$(symbol ave)) which has been obtained in the inter-symbol phase shift averaging step and the averaged inter-pilot block phase shift ($\Delta$(block ave)) which has been obtained in the inter-pilot block phase shift averaging step.

In accordance with a twelfth aspect of the present invention, in the eleventh aspect, in the frequency correction determination step, a frequency correction based on inter-symbol phase shift is obtained as:

frequency correction (symbol)=$\Delta$(symbol ave)/$2\pi \times SR$ (Hz)

(where "SR" is the symbol rate), and frequency correction candidates based on inter-pilot block phase shift are obtained as:

frequency correction (block, candidate)={$\Delta$(block ave)$\pm 2m\pi$}/$2\pi \times PBR$ (Hz)

(where "PBR" is the pilot symbol block rate and "m" is a non-negative integer), and one of the frequency correction candidates (frequency correction (block, candidate)) that is the nearest to the frequency correction based on inter-symbol phase shift (frequency correction (symbol)) is selected as the frequency correction.

In accordance with a thirteenth aspect of the present invention, in the eleventh aspect, the inter-symbol phase shift averaging step includes a first multiplication step, a second multiplication step, an addition step and an accumulation step. In the first multiplication step, the inter-symbol phase shift detected in the inter-symbol phase shift detection step is multiplied by (1−$\alpha$) ($\alpha$: oblivion coefficient). In the second multiplication step, the result of the accumulation step is multiplied by $\alpha$. In the addition step, the $\alpha$-multiplied result of the accumulation step and the (1−$\alpha$)-multiplied inter-symbol phase shift are added together and the addition is regarded as the averaged inter-symbol phase shift ($\Delta$(symbol ave)). In the accumulation step, the addition obtained in the addition step is accumulated.

In accordance with a fourteenth aspect of the present invention, in the eleventh aspect, the inter-pilot block phase shift averaging step includes a first multiplication step, a second multiplication step, an addition step and an accumulation step. In the first multiplication step, the inter-pilot block phase shift detected in the inter-pilot block phase shift detection step is multiplied by (1−$\beta$) ($\beta$: oblivion coefficient). In the second multiplication step, the result of the accumulation step is multiplied by $\beta$. In the addition step, the $\beta$-multiplied result of the accumulation step and the (1−$\beta$)-multiplied inter-pilot block phase shift are added together and the addition is regarded as the averaged inter-pilot block phase shift ($\Delta$(block ave)). In the accumulation step, the addition obtained in the addition step is accumulated.

In accordance with a fifteenth aspect of the present invention, in the eleventh aspect, the inter-symbol phase shift averaging step includes a first multiplication step, a second multiplication step, a first addition step and a first accumulation step, and the inter-pilot block phase shift averaging step includes a third multiplication step, a fourth multiplication step, a second addition step and a second accumulation step. In the first multiplication step, the inter-symbol phase shift detected in the inter-symbol phase shift detection step is multiplied by (1−$\alpha$) ($\alpha$: oblivion coefficient). In the second multiplication step, the result of the first accumulation step is multiplied by $\alpha$. In the first addition step, the $\alpha$-multiplied result of the first accumulation step and the (1−$\alpha$)-multiplied -multiplied inter-symbol phase shift are added together and the addition is regarded as the averaged inter-symbol phase shift ($\Delta$(symbol ave)). In the first accumulation step, the addition obtained in the first addition step is accumulated. In the third multiplication step, the inter-pilot block phase shift detected in the inter-pilot block phase shift detection step is multiplied by (1−$\beta$) ($\beta$: oblivion coefficient). In the fourth multiplication step, the result of the second accumulation step is multiplied by $\beta$. In the second addition step, the $\beta$-multiplied result of the second accumulation step and the (1−$\beta$)-multiplied inter-pilot block phase shift are added together and the addition is regarded as the averaged inter-pilot block phase shift (Δ(block ave)). In the second accumulation step, the addition obtained in the second addition step is accumulated.

In accordance with a sixteenth aspect of the present invention, in the ninth aspect, the frequency correction step includes a D/A conversion step in which D/A conversion is executed to the result of the frequency correction determination step.

In accordance with seventeenth through twenty-fourth aspects of the present invention, there are provided computer-readable record mediums storing programs for instructing a computer, an MPU (MicroProcessor Unit), a DSP (Digital Signal Processor), etc. to execute the frequency correction methods of the ninth through sixteenth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
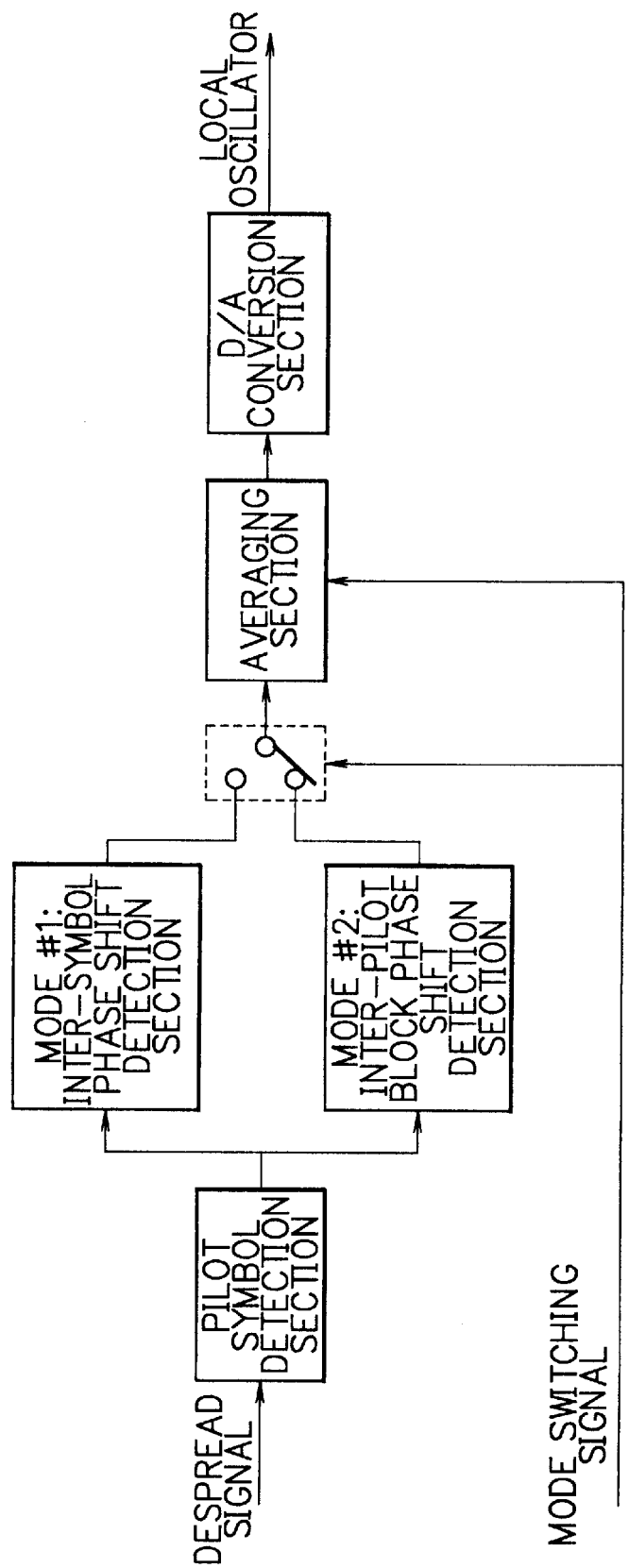
FIG. 1 is a schematic block diagram showing a frequency correction device employing a conventional frequency correction method.

Referring now to the drawings, a description will be given in detail of preferred embodiments in accordance with the present invention.

Figure 2:
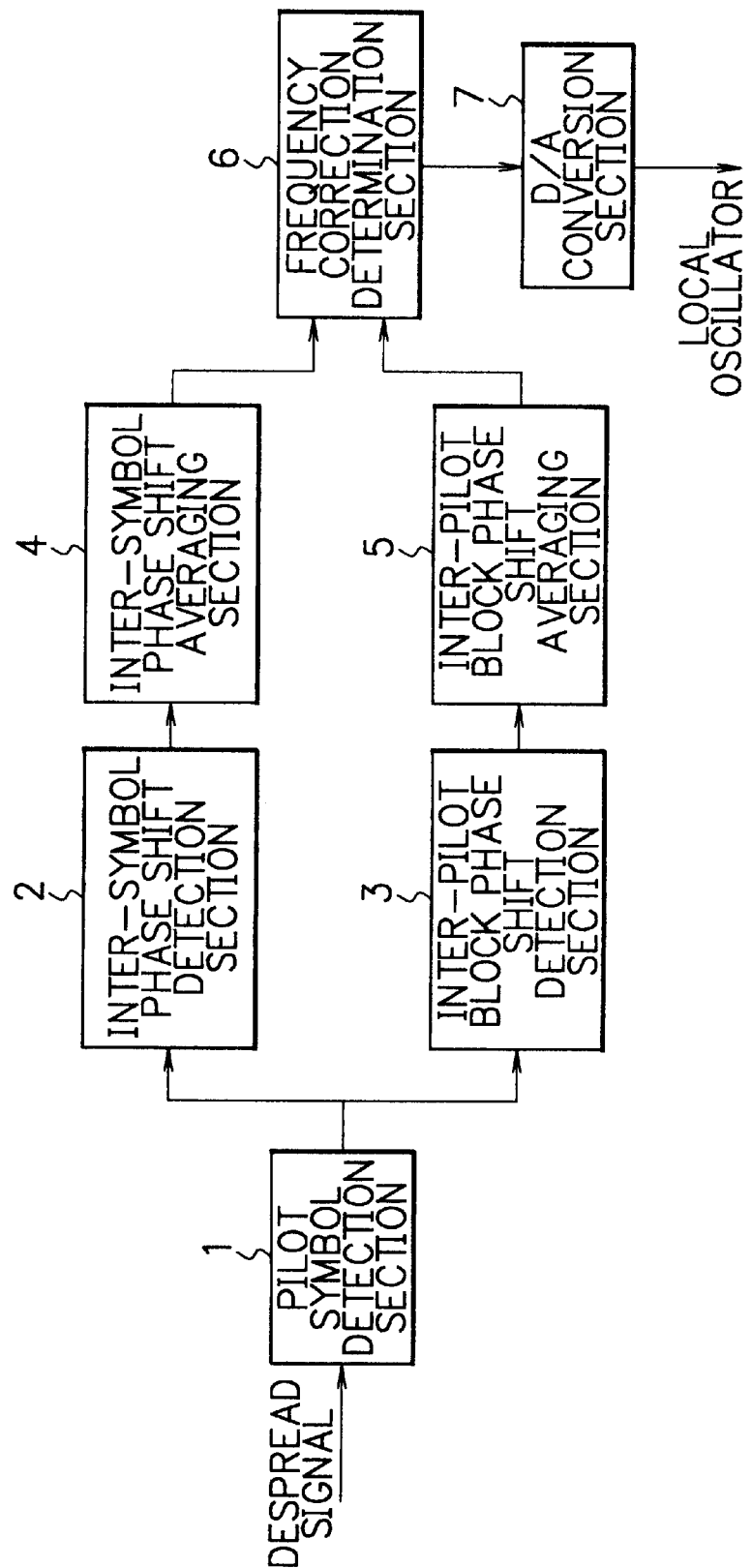
FIG. 2 is a schematic block diagram showing a frequency correction device in accordance with an embodiment of the present invention.

FIG. 2 is a schematic block diagram showing a frequency correction device in accordance with an embodiment of the present invention. Referring to FIG. 2, the frequency correction device comprises a pilot symbol detection section 1, an inter-symbol phase shift detection section 2, an inter-pilot block phase shift detection section 3, an inter-symbol phase shift averaging section 4, an inter-pilot block phase shift averaging section 5, a frequency correction determination section 6, and a D/A conversion section 7.

The frequency correction device shown in FIG. 2 is installed in a radio reception device (for example, a mobile radio communication device and/or a base station of a radio communication network) for correcting the frequency of its local oscillation signal which is used for the detection (despreading, descrambling) of a received radio signal. In the radio signal transmitted by the transmitting side (i.e. the base station in the case of downstream data transmission, the mobile radio communication device in the case of upstream data transmission), pilot symbol blocks (each of which is composed of a predetermined number of pilot symbols) are inserted periodically in order to implement the pilot synchronous detection.

The pilot symbol detection section 1 detects and extracts pilot symbols from a despread signal (the received radio signal after despreading (descrambling)). The inter-symbol phase shift detection section 2 detects the phase shifts between adjacent pilot symbols in a pilot symbol block (inter-symbol phase shifts). The inter-pilot block phase shift detection section 3 detects the phase shifts between adjacent pilot symbol blocks (inter-pilot block phase shifts). Incidentally, the "phase shift between adjacent pilot symbols" means a phase shift (relative to the local oscillation signal outputted by the local oscillator of the radio reception device) which occurs between the adjacent pilot symbols, and the "phase shift between adjacent pilot symbol blocks" means a phase shift (relative to the local oscillation signal) which occurs between the adjacent pilot symbol blocks. When there is no frequency difference between the received radio signal and the local oscillator of the radio reception device, each symbol of the received radio signal is received on each cycle ($2\pi$) of the local oscillation signal correctly, and thus the phase shifts become 0. On the other hand, when a frequency difference exists between the received radio signal and the local oscillator, certain amount of phase shifts occur. The inter-symbol phase shift averaging section 4 takes the average of the inter-symbol phase shifts which have been detected by the inter-symbol phase shift detection section 2. The inter-pilot block phase shift averaging section 5 takes the average of the inter-pilot block phase shifts which have been detected by the inter-pilot block phase shift detection section 3. The frequency correction determination section 6 determines an appropriate frequency correction based on the outputs of the inter-symbol phase shift averaging section 4 and the inter-pilot block phase shift averaging section 5, and outputs a digital frequency correction signal. The D/A conversion section 7 converts the digital frequency correction signal outputted by the frequency correction determination section 6 into an analog signal (voltage etc.). The analog signal outputted by the D/A conversion section 7 is supplied to the local oscillator for correcting the frequency of the local oscillation signal which is used for the detection (despreading) of the received radio signal.

In the frequency correction device of FIG. 2, coarse frequency correction based on the detection of the inter-symbol phase shifts and fine frequency correction based on the detection of the inter-pilot block phase shifts are executed simultaneously.

Figure 3:
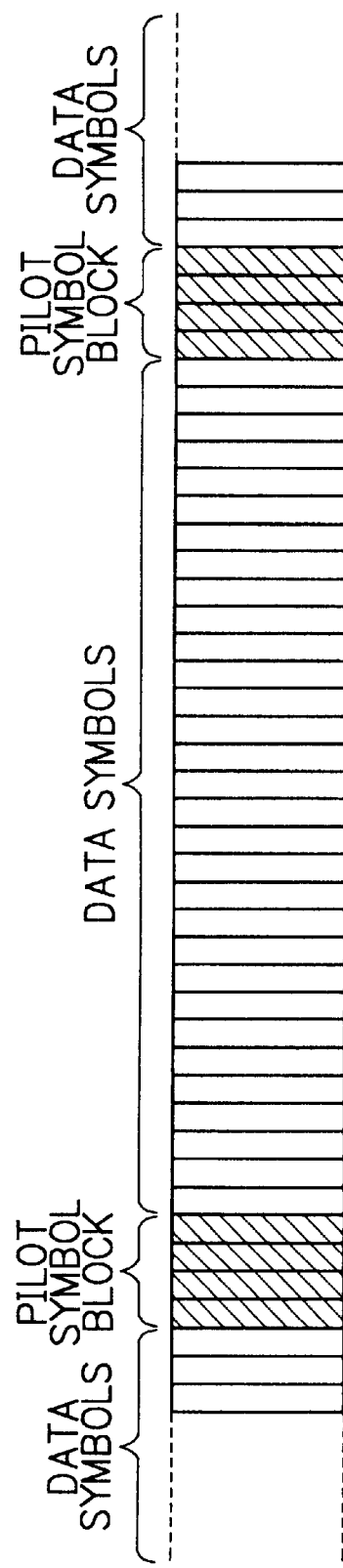
FIG. 3 is a schematic diagram showing an example of the frame composition of a received radio signal after despreading.

FIG. 3 is a schematic diagram showing an example of the frame composition of the received radio signal after despreading, which includes the pilot symbols. The signal shown in FIG. 3 is supplied to the pilot symbol detection section 1. Referring to FIG. 3, each frame of the received radio signal after despreading includes pilot symbols (P) and data symbols (D). Each symbol in the symbol sequence shown in FIG. 3 will hereafter be referred to as: . . . , D, D, P00, P01, P02, P03, D, D, . . . , D, D, P10, P11, P12, P13, D, D, . . . , D, D, P20, P21, P22, P23, D, D, . . . , D, D, P(n−1)0, P(n−1)1, P(n−1)2, P(n−1)3, D, D, . . . The notation "P00" will also be used for denoting the phase of the pilot symbol "P00" relative to the local oscillation signal.

For example, if the inter-symbol phase shift averaging section 4 employs and executes first-order interpolation, the inter-symbol phase shift averaging section 4 obtains an averaged inter-symbol phase shift (Δ(symbol ave)) as follows (incidentally, Δ(P00, P01) means the phase shift between the pilot symbols P00 and P01):

$$\Delta(\text{symbol } 0)=\{\Delta(P00, P01)+\Delta(P01, P02)+\Delta(P02, P03)\}/3$$

$$\Delta(\text{symbol } 1)=\{\Delta(P10, P11)+\Delta(P11, P12)+\Delta(P12, P13)\}/3$$

$$\Delta(\text{symbol } 2)=\{\Delta(P20, P21)+\Delta(P21, P22)+\Delta(P22, P23)\}/3$$

. . .

$$\Delta(\text{symbol } n-1)=\{\Delta(P(n-1)0, P(n-1)1)+\Delta(P(n-1)1, P(n-1)2)+\Delta(P(n-1)2, P(n-1)3)\}/3$$

$$\Delta(\text{symbol ave})=\{\Delta(\text{symbol } 0)+\Delta(\text{symbol } 1)+\Delta(\text{symbol } 2)+ \ldots +\Delta(\text{symbol } n-1)\}/n$$

Incidentally, the interpolation method employed by the inter-symbol phase shift averaging section 4 is not limited to the first-order interpolation, and other interpolation methods can of course be employed.

If we assume that the symbol rate is 1 Ksps (1000 Hz) (i.e. symbol cycle is 1 ms) and the pilot symbol block frequency is 100 bps (100 Hz) (i.e. pilot symbol block cycle is 10 ms), the frequency correction based on the inter-symbol phase shift can be executed correctly for a frequency difference of up to ±500 Hz, since the averaged inter-symbol phase shift ($\Delta(\text{symbol ave})$) is required to be within ±180°.

The frequency correction based on the inter-symbol phase shift is obtained as:

$$\text{frequency correction (symbol)}=\Delta(\text{symbol ave})/2\pi\times1000 \text{ Hz}$$

where "1000 Hz" is the symbol rate (frequency).

The inter-pilot block phase shift averaging section 5 obtains an averaged inter-pilot block phase shift ($\Delta(\text{block ave})$) as:

$$\Delta(\text{block sum})=\Delta[\{P00+P01+P02+P03\}/4,$$

$$\{P10+P11+P12+P13\}/4]$$

$$+\Delta[\{P10+P11+P12+P13\}/4, \{P20+P21+P22+P23\}/4]$$

$$+ \ldots +\Delta[\{P(n-2)0+P(n-2)1+P(n-2)2+P(n-2)3\}/4, \{P(n-1)0+P(n-1)1+P(n-1)2+P(n-1)3\}/4]$$

$$\Delta(\text{block ave})=\Delta(\text{block sum})/(n-1).$$

The frequency correction based on the inter-pilot block phase shift can be executed correctly for a frequency difference of up to ±50 Hz, since the pilot symbol block cycle is assumed to be 10 ms and the averaged inter-pilot block phase shift ($\Delta(\text{block ave})$) is required to be within ±180°.

The frequency correction based on the inter-pilot block phase shift (candidates) is obtained as:

$$\text{frequency correction (block, candidate)}=\{\Delta(\text{block ave})\pm2m\pi\}/2\pi\times 100 \text{ Hz}$$

where "100 Hz" is the pilot symbol block rate (frequency) and "m" is a non-negative integer.

Figure 4:
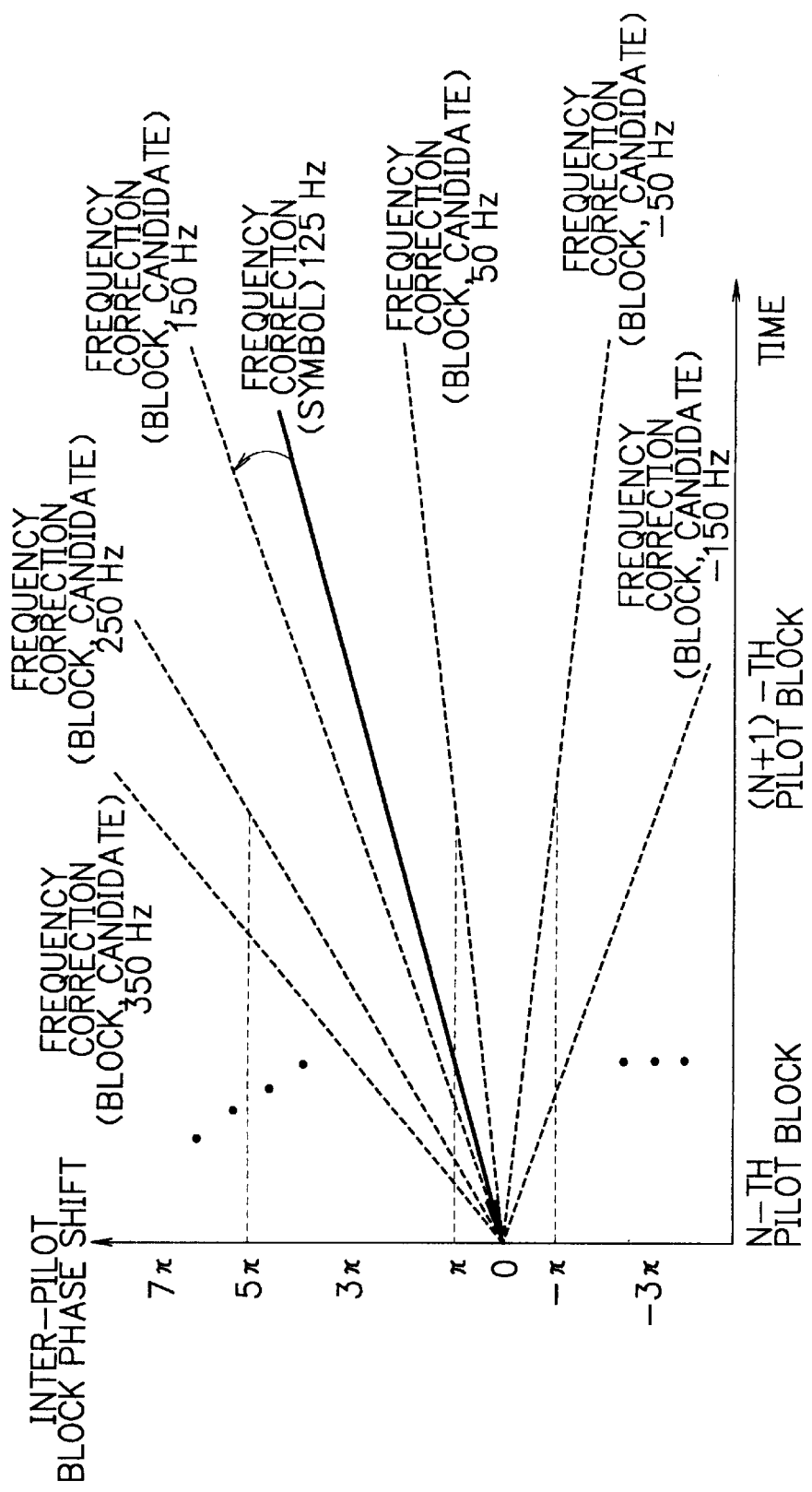
FIG. 4 is a graph showing an example of a candidate selection operation which is executed by a frequency correction determination section of the frequency correction device of FIG. 2.

Subsequently, the frequency correction determination section 6 selects one of the frequency correction candidates (frequency correction (block, candidate)) that is the nearest to the frequency correction based on the inter-symbol phase shift (frequency correction (symbol)), and outputs the selected frequency correction candidate as a combined frequency correction. FIG. 4 is a graph showing an example of the candidate selection operation of the frequency correction determination section 6. In the case of FIG. 4, a frequency correction candidate "150 Hz" based on the inter-pilot block phase shift is the nearest to the frequency correction (symbol) "125 Hz" and thus the frequency correction candidate "150 Hz" is selected by the frequency correction determination section 6 as the combined frequency correction.

In the following, an explanation will be given on a concrete example of the operation of the frequency correction device of FIG. 2.

In the following explanation, the phase (shift) of each pilot symbol (relative to the local oscillation signal, (0~2π)) is assumed to be:

$$P00=0, P01=\pi/4, P02=\pi/2, P03=3\pi/4,$$

$$P10=\pi, P11=5\pi/4, P12=3\pi/2, P13=7\pi/4$$

1. Inter-Symbol Phase Shift (Detection and Averaging)

$$\Delta(\text{symbol } 0)=\{\Delta(P00, P01)+\Delta(P01, P02)+\Delta(P02, P03)\}/3=(\pi/4+\pi/4+\pi/4)/3=\pi/4$$

$$\Delta(\text{symbol } 1)=\{\Delta(P10, P11)+\Delta(P11, P12)+\Delta(P12, P13)\}/3=(\pi/4+\pi/4+\pi/4)/3=\pi/4$$

$$\Delta(\text{symbol ave})=\{\Delta(\text{symbol } 0)+\Delta(\text{symbol } 1)\}/2=(\pi/4+\pi/4)/2=\pi/4$$

$$\text{frequency correction (symbol)}=\Delta(\text{symbol ave})/2\pi\times1000 \text{ Hz}=\pi/4/2\pi\times1000 \text{ Hz}=125 \text{ Hz}$$

2. Inter-Pilot Block Phase Shift (Detection and Averaging)

$$\Delta(\text{block ave})=\Delta[\{P00+P01+P02+P03\}/4, \{P10+P11+P12+P13\}/4]/(2-1)=\Delta[\{0+\pi/4+\pi/2+3\pi/4\}/4, \{\pi+5\pi/4+3\pi/2+7\pi/4\}/4]/(2-1)=\Delta(3\pi/8, 11\pi/8)=\pi$$

$$\text{frequency correction (block, candidate)}=\{\Delta(\text{block ave})\pm2m\pi\}/2\pi\times 100 \text{ Hz}=\{\pi\pm2m\pi\}/2\pi\times100 \text{ Hz}=50\pm100m \text{ Hz}= \ldots, 50, 150, 250, \ldots \text{ (Hz)}$$

3. Frequency Correction Determination combined frequency correction=candidate nearest to the frequency correction (symbol)=150 Hz (as shown in FIG. 4)

Figure 5:
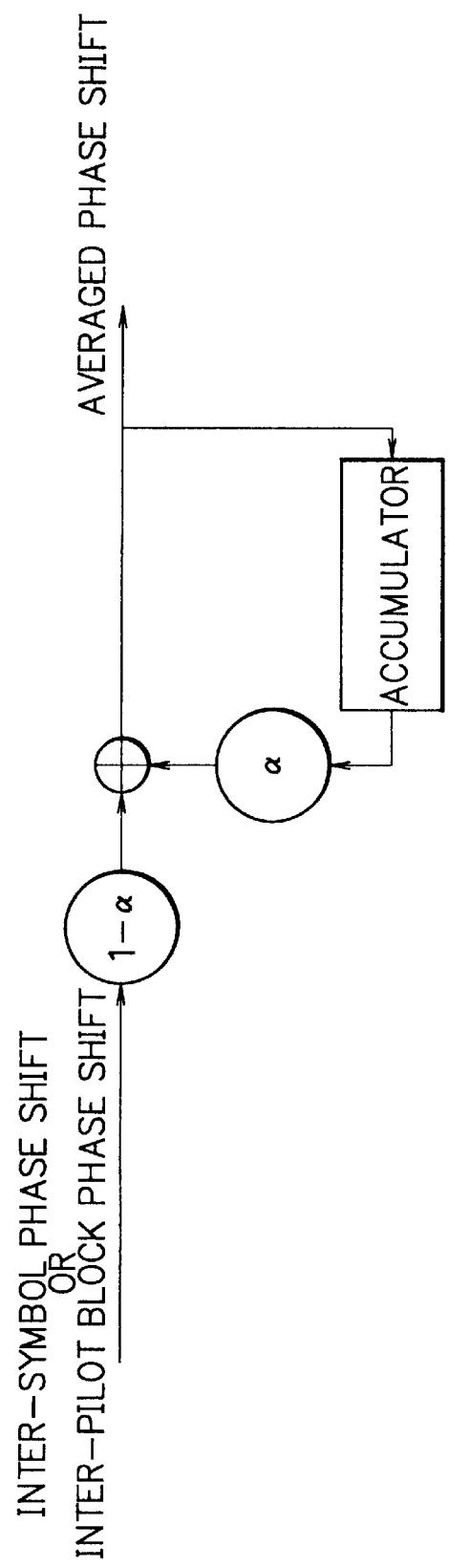
FIG. 5 is a schematic block diagram showing an example of the composition and the operation of an inter-symbol phase shift averaging section or an inter-pilot block phase shift averaging section of the frequency correction device of FIG. 2.

FIG. 5 is a schematic block diagram showing an example of the composition and the operation of the inter-symbol phase shift averaging section 4 or the inter-pilot block phase shift averaging section 5. The circuit shown in FIG. 5 can be applied to the inter-symbol phase shift averaging section 4 and/or the inter-pilot block phase shift averaging section 5. The circuit of FIG. 5, including two multipliers, an adder and an accumulator, is an averaging circuit employing an "oblivion coefficient" $\alpha$ ($\alpha$=0.9, 0.99, etc.). Referring to FIG. 5, the (inter-symbol/inter-pilot block) phase shift outputted by the inter-symbol phase shift averaging section 4 or the inter-pilot block phase shift averaging section 5 is first multiplied by (1−$\alpha$) and the result is supplied to the adder. The output of the accumulator is multiplied by $\alpha$ and the result is also supplied to the adder. The adder adds the $\alpha$-multiplied accumulator output and the (1−$\alpha$)-multiplied phase shift together, and outputs the addition as the averaged (inter-symbol/inter-pilot block) phase shift. The addition outputted by the adder is supplied to the accumulator, and the accumulator accumulates the addition. By use of the averaging circuit shown in FIG. 5, the composition and the operation of the inter-symbol phase shift averaging section 4 and/or the inter-pilot block phase shift averaging section 5 can be simplified.

As set forth hereinabove, in the frequency correction device and the frequency correction method in accordance with the present invention, coarse frequency correction based on the detection of the inter-symbol phase shifts and fine frequency correction based on the detection of the inter-pilot block phase shifts are executed simultaneously. An appropriate frequency correction is figured out by the frequency correction determination section 6 based on the detection of the inter-symbol phase shifts and the detection of the inter-pilot block phase shifts at once. Therefore, the frequency correction can be executed with high accuracy even if a large frequency difference (phase shift) occurred, and thereby detection properties of radio reception devices (a mobile radio communication device, a base station of a radio communication network, etc.) employing pilot synchronous detection can be improved considerably. A large frequency difference can be corrected accurately and at once regardless of whether it is at the beginning of communication or in the middle of communication, without the need of providing proper and correct timing for mode switching, etc.

Incidentally, while pilot symbols included in pilot symbol blocks have been used for the frequency correction in the above explanation, it is also possible to use other symbols as the pilot symbols as long as the contents of the symbols are previously known and phase information can be obtained from the symbols.

While the D/A conversion section 7 for converting the digital frequency correction signal outputted by the frequency correction determination section 6 into analog signal (analog voltage etc.) has been employed in the frequency correction device of FIG. 2, the D/A conversion section 7 can be omitted if the local oscillator can receive and use the digital frequency correction signal. The type of the frequency correction signal should be determined properly depending on the type of the local oscillator of the radio reception device.

Further, while the inter-symbol phase shift averaging section 4 and the inter-pilot block phase shift averaging section 5 have been employed in the above explanation for averaging the inter-symbol phase shifts and the inter-pilot block phase shifts, they can also be omitted if the inter-symbol phase shift and the inter-pilot block phase shift can be detected accurately without averaging.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A frequency correction device for correcting the frequency of a local oscillator of a radio reception device according to pilot synchronous detection, comprising:
   a pilot symbol detection means for detecting and extracting pilot symbols from a received radio signal after despreading;
   an inter-symbol phase shift detection means for detecting an inter-symbol phase shift between adjacent pilot symbols in a pilot symbol block;
   an inter-pilot block phase shift detection means for detecting a plurality of inter-pilot block phase shifts between adjacent pilot symbol blocks;
   a frequency correction determination means for determining a frequency correction based on an inter-pilot block phase shift of said plurality of inter-pilot block phase shifts which is closest to said inter-symbol phase shift; and
   a frequency correction means for executing frequency correction to the local oscillator based on the frequency correction which has been determined by the frequency correction determination means.

2. A frequency correction device as claimed in claim 1, wherein the frequency correction determination means obtains a frequency correction based on inter-symbol phase shift as:

$$\text{frequency correction (symbol)} = (\text{inter-symbol phase shift})/2\pi \times SR \text{ (Hz)}$$

where "SR" is the symbol rate, and obtains frequency correction candidates based on inter-pilot block phase shift as:

$$\text{frequency correction (block, candidate)} = \{(\text{inter-pilot block phase shift}) \pm 2m\pi\}/2\pi \times PBR \text{ (Hz), and}$$

where "PBR" is the pilot symbol block rate and "m" is a non-negative integer.

3. A frequency correction device as claimed in claim 1, further comprising:
   an inter-symbol phase shift averaging means for taking the average of the inter-symbol phase shifts which have been detected by the inter-symbol phase shift detection means; and
   an inter-pilot block phase shift averaging means for taking the average of the inter-pilot block phase shifts which have been detected by the inter-pilot block phase shift detection means, wherein:
   the frequency correction determination means determines the frequency correction based on the averaged inter-symbol phase shift (Δ(symbol ave)) which has been obtained by the inter-symbol phase shift averaging means and the averaged inter-pilot block phase shift (Δ(block ave)) which has been obtained by the inter-pilot block phase shift averaging means.

4. A frequency correction device as claimed in claim 3, wherein the frequency correction determination means obtains a frequency correction based on inter-symbol phase shift as:

$$\text{frequency correction (symbol)} = \Delta(\text{symbol ave})/2\pi \times SR \text{ (Hz)}$$

where "SR" is the symbol rate, and obtains frequency correction candidates based on inter-pilot block phase shift as:

$$\text{frequency correction (block, candidate)} = \{\Delta(\text{block ave}) \pm 2m\pi\}/2\pi \times PBR \text{ (Hz) and}$$

where "PBR" is the pilot symbol block rate and "m" is a non-negative integer.

5. A frequency correction device as claimed in claim 3, wherein the inter-symbol phase shift averaging means includes:
   a first multiplier for multiplying the inter-symbol phase shift detected by the inter-symbol phase shift detection means by $(1-\alpha)$ ($\alpha$: oblivion coefficient);
   a second multiplier for multiplying the output of an accumulator by $\alpha$;
   an adder for adding the $\alpha$-multiplied output of the accumulator and the $(1-\alpha)$-multiplied inter-symbol phase shift together and outputting the addition as the averaged inter-symbol phase shift (Δ(symbol ave)); and
   the accumulator for accumulating the addition outputted by the adder.

6. A frequency correction device as claimed in claim 3, wherein the inter-pilot block phase shift averaging means includes:
   a first multiplier for multiplying the inter-pilot block phase shift detected by the inter-pilot block phase shift detection means by $(1-\beta)$ ($\beta$: oblivion coefficient);

a second multiplier for multiplying the output of an accumulator by $\beta$;

an adder for adding the $\beta$-multiplied output of the accumulator and the $(1-\beta)$-multiplied inter-pilot block phase shift together and outputting the addition as the averaged inter-pilot block phase shift ($\Delta$(block ave)); and the accumulator for accumulating the addition outputted by the adder.

7. A frequency correction device as claimed in claim 3, wherein the inter-symbol phase shift averaging means includes:

a first multiplier for multiplying the inter-symbol phase shift detected by the inter-symbol phase shift detection means by $(1-\alpha)$ ($\alpha$: oblivion coefficient);

a second multiplier for multiplying the output of a first accumulator by $\alpha$;

a first adder for adding the $\alpha$-multiplied output of the first accumulator and the $(1-\alpha)$-multiplied inter-symbol phase shift together and outputting the addition as the averaged inter-symbol phase shift ($\Delta$(symbol ave)); and the first accumulator for accumulating the addition outputted by the first adder, and the inter-pilot block phase shift averaging means includes:

a third multiplier for multiplying the inter-pilot block phase shift detected by the inter-pilot block phase shift detection means by $(1-\beta)$ ($\beta$: oblivion coefficient);

a fourth multiplier for multiplying the output of a second accumulator by $\beta$;

a second adder for adding the $\beta$-multiplied output of the second accumulator and the $(1-\beta)$-multiplied inter-pilot block phase shift together and outputting the addition as the averaged inter-pilot block phase shift ($\Delta$(block ave)); and the second accumulator for accumulating the addition outputted by the second adder.

8. A frequency correction device as claimed in claim 1, wherein the frequency correction means includes a D/A conversion means for executing D/A conversion to the output of the frequency correction determination means.

9. A frequency correction method for correcting the frequency of a local oscillator of a radio reception device according to pilot synchronous detection, comprising the steps of:

a pilot symbol detection step in which pilot symbols are detected and extracted from a received radio signal after despreading;

an inter-symbol phase shift detection step in which an inter-symbol phase shift between adjacent pilot symbols in a pilot symbol block is detected;

an inter-pilot block phase shift detection step in which a plurality of inter-pilot block phase shifts between adjacent pilot symbol blocks are detected;

a frequency correction determination step in which a frequency correction is determined based on an inter-pilot block phase shift of said plurality of inter-pilot block phase shifts which is closest to said inter-symbol phase shift; and a frequency correction step in which frequency correction is executed to the local oscillator based on the frequency correction which has been determined in the frequency correction determination step.

10. A frequency correction method as claimed in claim 9, wherein in the frequency correction determination step:

a frequency correction based on inter-symbol phase shift is obtained as:

frequency correction (symbol)=(inter-symbol phase shift)/$2\pi \times SR$ (Hz)

where "SR" is the symbol rate, and frequency correction candidates based on inter-pilot block phase shift are obtained as:

frequency correction (block, candidate)={(inter-pilot block phase shift)$\pm 2m\pi$}/$2\pi \times PBR$ (Hz), and where "PBR" is the pilot symbol block rate and "m" is a non-negative integer.

11. A frequency correction method as claimed in claim 9, further comprising:

an inter-symbol phase shift averaging step in which the average of the inter-symbol phase shifts which have been detected in the inter-symbol phase shift detection step is taken; and an inter-pilot block phase shift averaging step in which the average of the inter-pilot block phase shifts which have been detected in the inter-pilot block phase shift detection step is taken, wherein:

in the frequency correction determination step, the frequency correction is determined based on the averaged inter-symbol phase shift ($\Delta$(symbol ave)) which has been obtained in the inter-symbol phase shift averaging step and the averaged inter-pilot block phase shift ($\Delta$(block ave)) which has been obtained in the inter-pilot block phase shift averaging step.

12. A frequency correction method as claimed in claim 11, wherein in the frequency correction determination step:

a frequency correction based on inter-symbol phase shift is obtained as:

frequency correction (symbol)=$\Delta$(symbol ave)/$2\pi \times SR$ (Hz)

where "SR" is the symbol rate, and frequency correction candidates based on inter-pilot block phase shift are obtained as:

frequency correction (block, candidate)={$\Delta$(block ave)$\pm 2m\pi$}/$2\pi \times PBR$ (Hz), and where "PBR" is the pilot symbol block rate and "m" is a non-negative integer.

13. A frequency correction method as claimed in claim 11, wherein the inter-symbol phase shift averaging step includes:

a first multiplication step in which the inter-symbol phase shift detected in the inter-symbol phase shift detection step is multiplied by $(1-\alpha)$ ($\alpha$: oblivion coefficient);

a second multiplication step in which the result of an accumulation step is multiplied by $\alpha$;

an addition step in which the $\alpha$-multiplied result of the accumulation step and the $(1-\alpha)$-multiplied inter-symbol phase shift are added together and the addition is regarded as the averaged inter-symbol phase shift ($\Delta$(symbol ave)); and the accumulation step in which the addition obtained in the addition step is accumulated.

14. A frequency correction method as claimed in claim 11, wherein the inter-pilot block phase shift averaging step includes:

a first multiplication step in which the inter-pilot block phase shift detected in the inter-pilot block phase shift detection step is multiplied by $(1-\beta)$ ($\beta$: oblivion coefficient);

a second multiplication step in which the result of an accumulation step is multiplied by β;

an addition step in which the β-multiplied result of the accumulation step and the (1−β)-multiplied inter-pilot block phase shift are added together and the addition is regarded as the averaged inter-pilot block phase shift (Δ(block ave)); and the accumulation step in which the addition obtained in the addition step is accumulated.

15. A frequency correction method as claimed in claim 11, wherein the inter-symbol phase shift averaging step includes:

a first multiplication step in which the inter-symbol phase shift detected in the inter-symbol phase shift detection step is multiplied by (1−α) (α: oblivion coefficient);

a second multiplication step in which the result of a first accumulation step is multiplied by α;

a first addition step in which the α-multiplied result of the first accumulation step and the (1−α)-multiplied inter-symbol phase shift are added together and the addition is regarded as the averaged inter-symbol phase shift (Δ(symbol ave)); and the first accumulation step in which the addition obtained in the first addition step is accumulated, and the inter-pilot block phase shift averaging step includes:

a third multiplication step in which the inter-pilot block phase shift detected in the inter-pilot block phase shift detection step is multiplied by (1−β) (β: oblivion coefficient);

a fourth multiplication step in which the result of a second accumulation step is multiplied by β;

a second addition step in which the β-multiplied result of the second accumulation step and the (1−β)-multiplied inter-pilot block phase shift are added together and the addition is regarded as the averaged inter-pilot block phase shift (Δ(block ave)); and the second accumulation step in which the addition obtained in the second addition step is accumulated.

16. A frequency correction method as claimed in claim 9, wherein the frequency correction step includes a D/A conversion step in which D/A conversion is executed to the result of the frequency correction determination step.

17. A computer-readable record medium storing a program for instructing a computer, an MPU (MicroProcessor Unit), a DSP (Digital Signal Processor), etc. to execute a frequency correction process for correcting the frequency of a local oscillator of a radio reception device according to pilot synchronous detection, wherein the frequency correction process includes the steps of:

a pilot symbol detection step in which pilot symbols are detected and extracted from a received radio signal after despreading;

an inter-symbol phase shift detection step in which an inter-symbol phase shift between adjacent pilot symbols in a pilot symbol block is detected;

an inter-pilot block phase shift detection step in which a plurality of inter-pilot block phase shifts between adjacent pilot symbol blocks are detected;

a frequency correction determination step in which a frequency correction is determined based on an inter-pilot block phase shift of said plurality of inter-pilot block phase shifts which is closest to said inter-symbol phase shift; and a frequency correction step in which frequency correction is executed to the local oscillator based on the frequency correction which has been determined in the frequency correction determination step.

18. A computer-readable record medium as claimed in claim 17, wherein in the frequency correction determination step:

a frequency correction based on inter-symbol phase shift is obtained as:

frequency correction (symbol)=(inter-symbol phase shift)/$2\pi \times SR$ (Hz)

where "SR" is the symbol rate, and frequency correction candidates based on inter-pilot block phase shift are obtained as:

frequency correction (block, candidate)={(inter-pilot block phase shift)$\pm 2m\pi$}/$2\pi \times PBR$ (Hz), and where "PBR" is the pilot symbol block rate and "m" is a non-negative integer.

19. A computer-readable record medium as claimed in claim 17, wherein the frequency correction process further comprises:

an inter-symbol phase shift averaging step in which the average of the inter-symbol phase shifts which have been detected in the inter-symbol phase shift detection step is taken; and an inter-pilot block phase shift averaging step in which the average of the inter-pilot block phase shifts which have been detected in the inter-pilot block phase shift detection step is taken, wherein:

in the frequency correction determination step, the frequency correction is determined based on the averaged inter-symbol phase shift (Δ(symbol ave)) which has been obtained in the inter-symbol phase shift averaging step and the averaged inter-pilot block phase shift (Δ(block ave)) which has been obtained in the inter-pilot block phase shift averaging step.

20. A computer-readable record medium as claimed in claim 19, wherein in the frequency correction determination step:

a frequency correction based on inter-symbol phase shift is obtained as:

frequency correction (symbol)=Δ(symbol ave)/$2\pi \times SR$ (Hz)

where "SR" is the symbol rate, and frequency correction candidates based on inter-pilot block phase shift are obtained as:

frequency correction (block, candidate)={Δ(block ave)$\pm 2m\pi$}/$2\pi \times PBR$ (Hz), and where "PBR" is the pilot symbol block rate and "m" is a non-negative integer.

21. A computer-readable record medium as claimed in claim 19, wherein the inter-symbol phase shift averaging step includes:

a first multiplication step in which the inter-symbol phase shift detected in the inter-symbol phase shift detection step is multiplied by (1−α) (α: oblivion coefficient);

a second multiplication step in which the result of an accumulation step is multiplied by α;

an addition step in which the α-multiplied result of the accumulation step and the (1−α)-multiplied inter-symbol phase shift are added together and the addition is regarded as the averaged inter-symbol phase shift (Δ(symbol ave)); and the accumulation step in which the addition obtained in the addition step is accumulated.

22. A computer-readable record medium as claimed in claim 19, wherein the inter-pilot block phase shift averaging step includes:

a first multiplication step in which the inter-pilot block phase shift detected in the inter-pilot block phase shift detection step is multiplied by $(1-\beta)$ ($\beta$: oblivion coefficient);

a second multiplication step in which the result of an accumulation step is multiplied by $\beta$;

an addition step in which the $\beta$-multiplied result of the accumulation step and the $(1-\beta)$-multiplied inter-pilot block phase shift are added together and the addition is regarded as the averaged inter-pilot block phase shift ($\Delta$(block ave)); and the accumulation step in which the addition obtained in the addition step is accumulated.

23. A computer-readable record medium as claimed in claim 19, wherein the inter-symbol phase shift averaging step includes:

a first multiplication step in which the inter-symbol phase shift detected in the inter-symbol phase shift detection step is multiplied by $(1-\alpha)$ ($\alpha$: oblivion coefficient);

a second multiplication step in which the result of a first accumulation step is multiplied by $\alpha$;

a first addition step in which the $\alpha$-multiplied result of the first accumulation step and the $(1-\alpha)$-multiplied inter-symbol phase shift are added together and the addition is regarded as the averaged inter-symbol phase shift ($\Delta$(symbol ave)); and the first accumulation step in which the addition obtained in the first addition step is accumulated, and the inter-pilot block phase shift averaging step includes:

a third multiplication step in which the inter-pilot block phase shift detected in the inter-pilot block phase shift detection step is multiplied by $(1-\beta)$ ($\beta$: oblivion coefficient);

a fourth multiplication step in which the result of a second accumulation step is multiplied by $\beta$;

a second addition step in which the $\beta$-multiplied result of the second accumulation step and the $(1-\beta)$-multiplied inter-pilot block phase shift are added together and the addition is regarded as the averaged inter-pilot block phase shift ($\Delta$(block ave)); and the second accumulation step in which the addition obtained in the second addition step is accumulated.

24. A computer-readable record medium as claimed in claim 17, wherein the frequency correction step includes a D/A conversion step in which D/A conversion is executed to the result of the frequency correction determination step.

* * * * *